United States Patent [19]

Vaughn

[11] Patent Number: 5,070,645
[45] Date of Patent: Dec. 10, 1991

[54] FLOWER POT CONTAINER

[75] Inventor: Daniel L. Vaughn, Powell, Ohio

[73] Assignee: Highland Supply Corporation, Highland, Ill.

[21] Appl. No.: 693,904

[22] Filed: May 1, 1991

Related U.S. Application Data

[63] Continuation of Ser. No. 335,596, Apr. 10, 1989, abandoned.

[51] Int. Cl.$^5$ ............................................. A01H 11/00
[52] U.S. Cl. ............................................. 47/72; 47/66
[58] Field of Search ................... 47/66, 67, 68, 69, 70, 47/71, 72, 73, 74-78, 84, 39; 220/401; 206/423; 383/33, 117

[56] References Cited

U.S. PATENT DOCUMENTS

| | | | |
|---|---|---|---|
| 716,668 | 12/1902 | Cheney | 47/66 |
| 923,663 | 6/1909 | Kroeger | 47/66 |
| 1,052,379 | 2/1913 | Ranken | 220/401 |
| 1,087,702 | 2/1914 | Van Patten | |
| 1,206,708 | 11/1916 | Hutchins | 47/73 |
| 1,421,628 | 7/1922 | Watkins | 220/401 |
| 1,521,184 | 12/1924 | Holton | |
| 1,670,709 | 5/1928 | Blood | 383/33 |
| 2,942,823 | 6/1960 | Chapman | 47/78 |
| 3,485,281 | 12/1969 | Wicks | 383/117 |
| 4,250,664 | 2/1981 | Remke | 206/423 |

FOREIGN PATENT DOCUMENTS 274167 6/1951 Switzerland .

OTHER PUBLICATIONS

"A Good Case for Terrariums", 2 page article, p. D-18.

Primary Examiner—David A. Scherbel
Assistant Examiner—Michele A. Van Patten
Attorney, Agent, or Firm—Dunlap, Codding, Peterson & Lee

[57] ABSTRACT

A flower pot cover comprising a rigid open framework having a fabric cover and a water-resistant lining.

1 Claim, 2 Drawing Sheets

FLOWER POT CONTAINER

This is a continuation of co-pending application Ser. No. 335,596 filed on 04-10-89 now abandoned entitled "FLOWER POT CONTAINER".

FIELD OF THE INVENTION

The present invention generally relates to containers, and in particular to decorative containers for flower pots.

SUMMARY OF THE INVENTION

The present invention comprises a flower pot container. The container comprises a frame which defines a polyhedron. A fabric cover is supported on the frame. Preferably, the container further comprises a water-resistant liner.

DETAILED DESCRIPTION OF THE PREFERRED EMBODIMENTS

Figure 1:
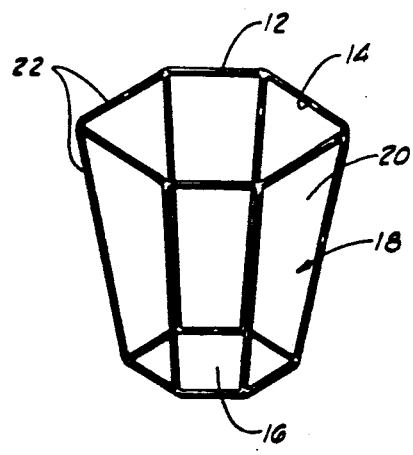
FIG. 1 is a frontal perspective view of the frame of the flower pot container.
Figure 3:
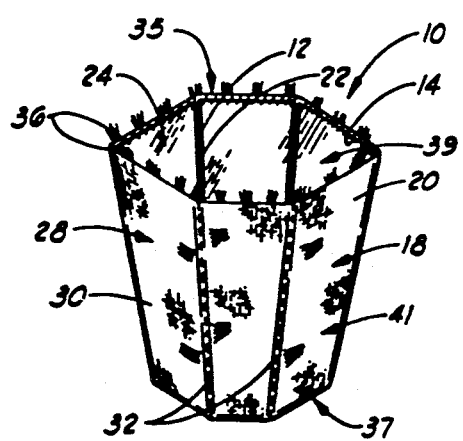
FIG. 3 is a frontal perspective view of the frame with attached liner, as shown in FIG. 2, having a fabric cover supported thereon.

With reference to the figures in general, the present invention comprises a flower pot container designated by the reference numeral 10 (FIG. 3). As best shown in FIG. 1, the container 10 comprises a frame 12. The frame 12 defines a polyhedron, and has a mouth or upper end 14 for receiving the flower pot (not shown) having an upper end, a lower end and an outer peripheral surface to be contained therein, and a lower end or base 16. Between the mouth 14 and the base 16, the frame 12 defines a sidewall 18.

The shape of the sidewall will be determined by the shape of the mouth 14 of the frame 12 and by the shape of the base 16. In one preferred embodiment shown in FIGS. 1-4, the sidewall 18 is defined by a plurality of substantially vertical planes 20. As used herein, "substantially vertical" means lying in a plane at any angle from the plane of the base 16.

Referring again to FIG. 1, the frame 12 preferably is constructed of a shape sustaining substance such as metal. More preferably, the frame 12 is comprised of a plurality of rigid, rod-shaped members or stays 22 interconnected in some suitable fashion, such as by welding.

Figure 2:
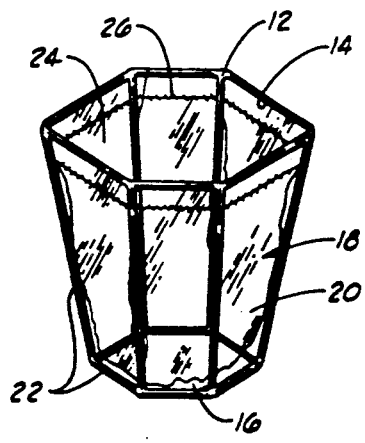
FIG. 2 is a frontal perspective view of the frame shown in FIG. 1 with a liner attached.

Referring now to FIG. 2, the container 10 preferably also comprises a liner 24. The liner 24 comprises a sheet of relatively thin, flexible, water resistant and transparent material such as a plastic film. The liner 24 draped inside the frame 12 so that the edges extend slightly above the mouth 14 of the frame 12. Then, the edges are folded over the mouth 14 and affixed such as by stitching to form a hem 26.

Turning next to FIG. 3, the container 10 of the present invention also comprises a non-shape sustaining fabric cover 28 supported on the frame 12. Preferably, the fabric cover 28 has a cloth-like appearance. The cover 28 may be provided with an attractive surface ornamentation. The cover 28 may be composed of a plurality of panels of fabric, a bottom panel (not shown) underlying the base 16 of the frame 12 thereby forming a closed lower end and several side panels 30 overlying the sidewall 18 of the container. The seams 32 connecting the panels 30 preferably directly overlie the stays 22 of the frame 12.

As shown in FIG. 3, when the cover 28 is connected to or supported on the frame 12, the cover 28 and the frame 12 form an opened upper end 35, a closed lower end 37, an inner peripheral surface 39 and an outer peripheral surface 41. The frame 12 with the cover 28 connected thereto forms the opened upper end 35 which is sized and shaped for receiving a flower pot (not shown) and which is generally near the mouth or upper end 14 of the frame 12. The frame 12 with the cover 28 connected thereto substantially encompasses the entire outer periphery of the flower pot (not shown) when the flower pot (not shown) is disposed through the opened upper end 35 of the frame 12 with the cover 28 connected thereto. The liner 24 extends generally over the entire inner peripheral surface 39 formed by the frame 12 with the cover 28 connected thereto and the liner 24 is interposed between the outer peripheral surface of the flower pot (not shown) and the cover 28 when the flower pot (not shown) is disposed on the frame 12 with the cover 28 connected thereto.

In the embodiment shown in FIG. 3, the uppermost edges 34 of the side panels 30 have a decorative edging formed by tufts 36 of the threads forming the fabric cover 28. In this embodiment, the cover 28 is affixed to the frame 12 by stitching the edge to the mouth 14 of the frame.

Figure 4:
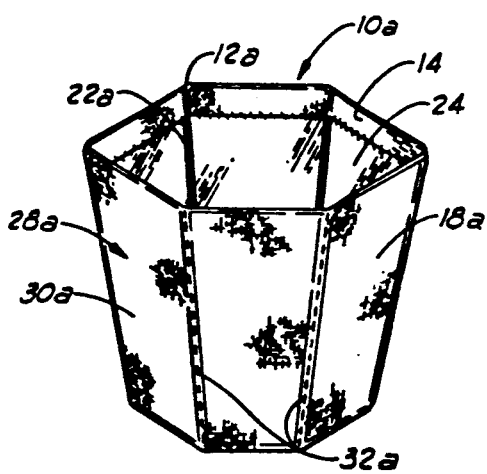
FIG. 4 is a frontal perspective view of the frame with attached liner, as shown in FIG. 2, having another style of fabric cover supported thereon.

Shown in FIG. 4 is a modified container which is constructed exactly like the container 10, except the edges of the cover 28a are turned in over the mouth 14a of the frame 12a and stitched down in much the same fashion as is the upper edge of the liner 24. In this case, the hem 38a of the fabric cover 28a should extend below the hem 26a of the liner 24a to cover the liner hem, as this will produce a neater appearance.

Figure 5:
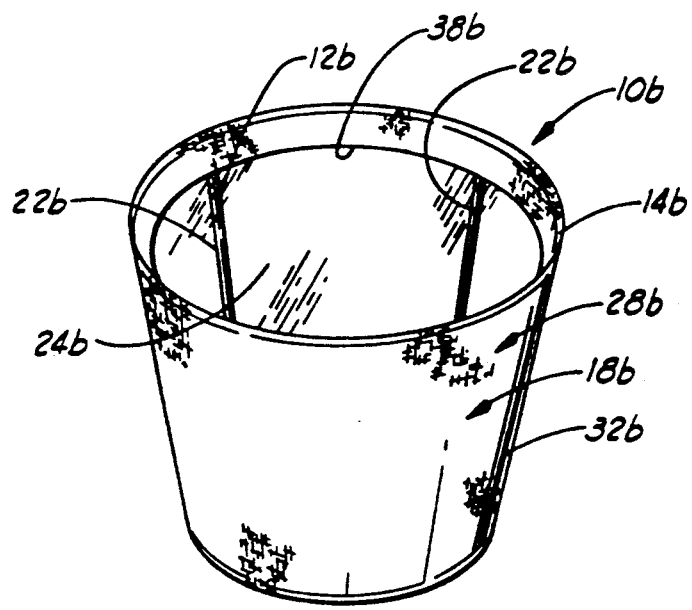
FIG. 5 is a frontal perspective view of another embodiment of the flower pot container of the present invention wherein the container is round in cross-section.

As indicated previously, the shape of the sidewall 18 of the container 10 may be varied by changing the shape of the frame 12. Shown in FIG. 5 is a modified container 10b which is constructed exactly like the container 10a, except the frame 12b and cover 28b are shaped to provided a container 10b which is circular shaped in cross section.

Figure 6:
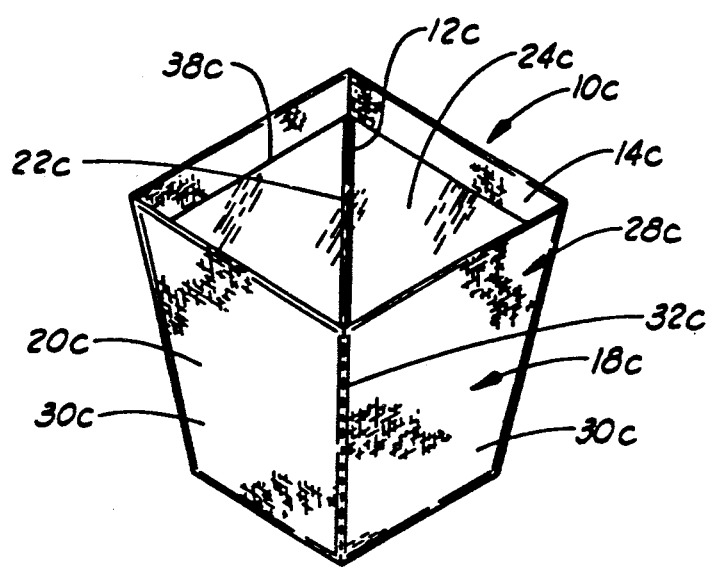
FIG. 6 is a frontal perspective view of another embodiment of the flower pot container of the present invention wherein the container is square in cross-section.

Shown in FIG. 6 is a modified container 10c which is constructed exactly like the container 10a, except the 12c and cover 28c are shaped to provided a container 10c which is square shaped in cross section.

Now it will be appreciated that the present invention provides containers for flower pots which are both practical and attractive. The frame provides the container with rigid support, and the liner makes the container waterproof. At the same time, the cover gives the container the look and feel of fabric, and attractive but heretofore impractical material for decorative flower pot containers.

Changes may be made in the construction, operation and arrangement of the various parts, elements, steps or sequence of steps and procedures described herein without departing from the spirit and scope of the invention as defined in the following claims.

What is claimed is:

1. A flower pot container, comprising:

a flower pot having an upper end, a lower end and an outer peripheral surface;

a frame having an upper end and a lower end, comprising and open frame work formed of rigid, interconnected stays, the frame having a side wall defined by a plurality of substantially vertical plan;

a cover constructed of a non-shape sustaining fabric connected to the frame and extending generally between the upper and the lower ends of the frame so the frame with the cover connected thereto forms an outer peripheral surface and an inner peripheral surface and the frame with the cover connected thereto forms an opened upper end generally near the upper end of the frame shaped and sized for receiving the flower pot, the cover covering the lower end of the frame thereby forming a closed lower end, the flower pot being disposed through the opened upper end of the frame with the cover connected thereto, and the frame with the cover connected thereto encompassing substantially the entire outer peripheral surface of the flower pot, the cover comprising a plurality of side panels with the side panels being interconnected along adjacent seams, each seam being positioned directly over one of the stays of the frame.

* * * * *